(12) United States Patent
Leinonen et al.

(10) Patent No.: US 7,523,507 B2
(45) Date of Patent: Apr. 21, 2009

(54) DELIVERY OF NON-PERMANENT MEDIA FILES TO A MOBILE STATION

(75) Inventors: Marko Leinonen, Oulu (FI); Anu Leinonen, Oulu (FI)

(73) Assignee: Nokia Corporation, Espoo (FI)

(*) Notice: Subject to any disclaimer, the term of this patent is extended or adjusted under 35 U.S.C. 154(b) by 664 days.

(21) Appl. No.: 10/855,688

(22) Filed: May 27, 2004

(65) Prior Publication Data

US 2005/0278794 A1   Dec. 15, 2005

(51) Int. Cl.
G06F 7/04   (2006.01)
(52) U.S. Cl. .................. 726/32; 370/328; 370/338; 370/329; 455/62; 455/63.1; 455/150.1; 455/509; 713/193
(58) Field of Classification Search ............ 726/32
See application file for complete search history.

(56) References Cited

U.S. PATENT DOCUMENTS

| | | | |
|---|---|---|---|
| 5,291,554 A | 3/1994 | Morales | 380/5 |
| 5,426,594 A | 6/1995 | Wright et al. | 364/514 |
| 2003/0086687 A1* | 5/2003 | Sasaki | 386/52 |
| 2003/0225614 A1* | 12/2003 | Rodriguez et al. | 705/14 |
| 2004/0233868 A1* | 11/2004 | Farnham | 370/329 |
| 2005/0033700 A1* | 2/2005 | Vogler et al. | 705/57 |

FOREIGN PATENT DOCUMENTS

| WO | WO 02/03630 | * | 1/2002 |
|---|---|---|---|
| WO | WO-02/03630 A1 | | 1/2002 |
| WO | WO-2004/043110 A1 | | 5/2004 |

* cited by examiner

*Primary Examiner*—Matthew B Smithers
*Assistant Examiner*—Shewaye Gelagay
(74) *Attorney, Agent, or Firm*—Harrington & Smith, PC

(57) ABSTRACT

A media file content provider 30 sends a non-permanent copy of a media file, such as a music or video file, to a second mobile station MS 34 in response to a request from a first MS 22. The copy may be rendered non-permanent by streaming it, by encrypting it, and by appending a first instruction to automatically delete it after playing. The first MS 22 may be given an option of delivery pathways, such as cellular 76, 78, WLAN 80, or DVB-H 84. After playing, an offer is made to the second MS 34 to purchase a permanent copy of the media file. If accepted, the content provider may provide another copy of the media file, or preferably a permanent decryption key or a second instruction that defeats the first instruction prior to its deletion of the media file.

37 Claims, 7 Drawing Sheets

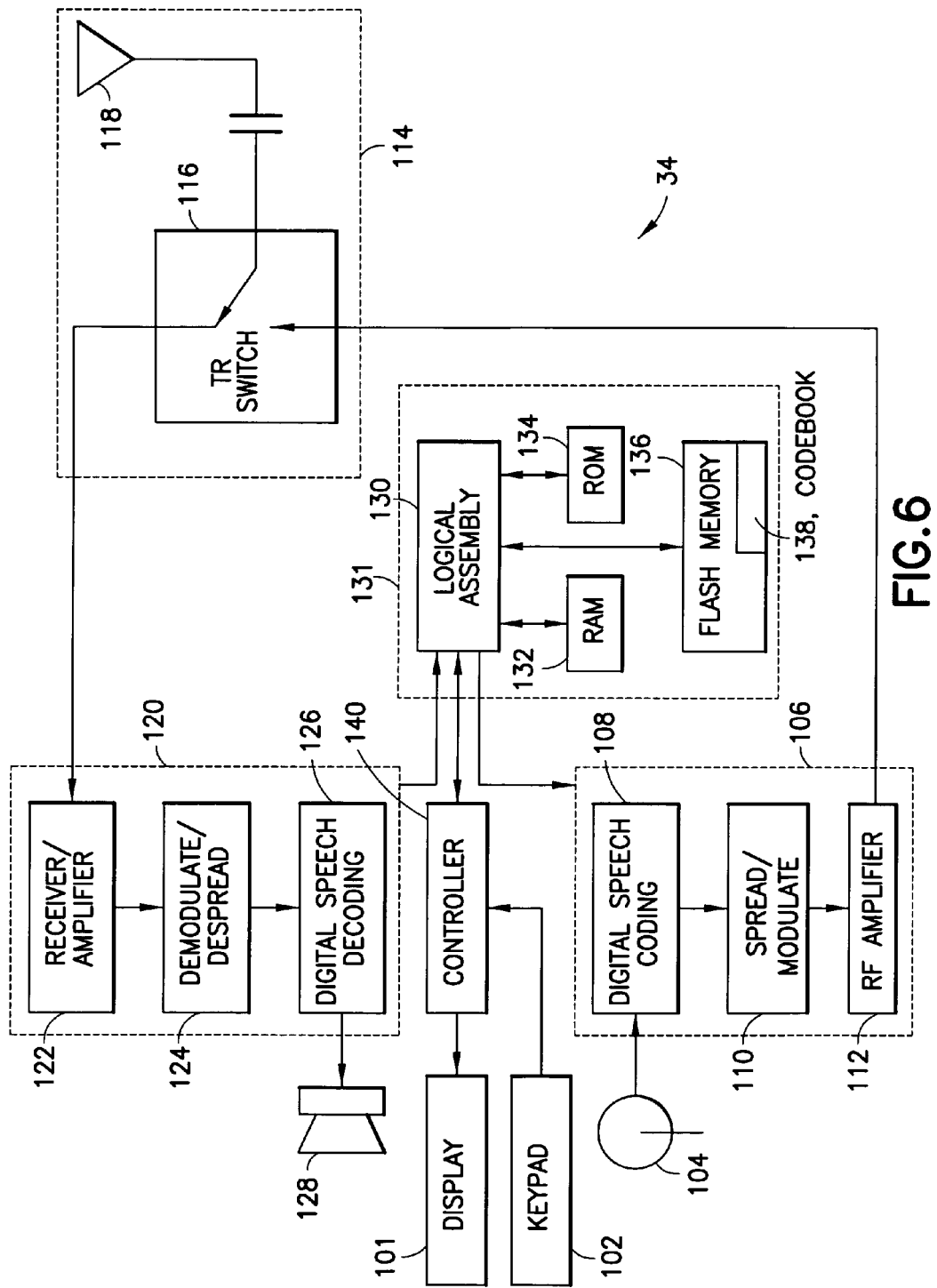

DELIVERY OF NON-PERMANENT MEDIA FILES TO A MOBILE STATION

FIELD OF THE INVENTION

The present invention relates to mobile stations and the delivery of non-permanent entertainment media files such as music or video files. It is particularly related to adapting delivery of such media files to existing mobile stations with relatively limited memory capacity from a provider of such files in response to a request from a separate mobile station.

BACKGROUND

With the music industry's embrace of the digital transfer of copyrighted entertainment files at the retail level, downloading of music files has undergone explosive growth and has led to the creation and marketing of specific portable devices dedicated to playing and storing digital music. While previous portable music players such as portable CD and tape players relied on a removable storage media to carry segments of a user's music library, portable devices adapted to play downloaded music are characterized in that the medium on which the entertainment content is digitally stored is exclusively internal, and not regularly removed and interchanged by retail users of the devices.

The first generation of such digital portable devices include, for example, the iPod (available through Apple Computer Corporation of Cupertino, Calif.), the Rio (available in North America through Digital Networks North America of Santa Clara Calif.; elsewhere through D&M Holdings, Inc. of Tokyo, Japan), and the Nomad (available in North America through Creative Labs of Milpitas, Calif.; elsewhere through Creative Technology of Singapore). These first generation portable digital music players are limited in that an intermediary computer is necessary between the portable music player and an originating source of the entertainment content files. Generally, users of these devices would first fix a copy of their desired entertainment media file to an intermediate personal computer, such as by copying media files from an already owned CD or downloading directly from a content provider over the internet. Once the desired content files were copied to the personal computer, the user would then upload the desired tracks from the PC to the portable digital device. More adept users could copy to their portable digital device directly from a CD or an online content provider, but the intermediary computer remained necessary.

To avoid the undesirable result of consumers carrying multiple different portable devices, each being dedicated to a different set of functions (e.g., mobile phone, personal digital assistant, portable gaming device, portable digital music player), manufacturers have been converging certain different functions into integrated devices. However, many traditional portable devices remain in use that do not have such convergent functionality built in. More such traditional devices are currently being put into use for those consumers whose personal cost-benefit analysis weighs against such multi-functional portable devices.

One such traditional device is a mobile phone with internal memory that is insufficient to store many different music media files. For example, a typical popular music song, encoded using the popular MP3 format, occupies about 3-5 Mbytes of memory when stored. Nokia's widely used mobile station model 7650 is listed as having about 4 Mbytes of free user memory (though models 7600 and 7700 versions have 30 and 25 Mbytes internal memory, respectively), and other more basic mobile stations may have even less. The mobile terminal memory capacity can be extended by using memory cards, but not all model support this feature. Thus a single music file can occupy substantially all of the free memory of a mobile station, imposing a hardware barrier that keeps some consumers from experimenting with portable digital music on a traditional mobile phone. What is needed in the art is a way to allow the users of portable devices with limited memory to experience portable digital music on those devices, without the users having to actively manage memory in those devices by deleting ringtones or other files. The inventors have found that their developments in pursuing a solution to the above need can be put to broader uses beyond just limited-memory devices, as detailed below.

SUMMARY OF THE INVENTION

This invention is in one aspect a program of machine-readable instructions, tangibly embodied on an information bearing medium and executable by a digital data processor, to perform actions directed toward providing a media file to a third party mobile station. The medium may be a computer hard drive, an optical or magnetic disk, or the like. The actions include receiving a request over a network from a first party to deliver a particular media file to a third party mobile station that is identified in the request, and providing a non-permanent copy of the particular media file to the third party mobile station at least partly through a wireless network. Preferably, the first party is a mobile station that selects one of several communication pathways by which the media file is to be delivered, and remits payment or authorization for payment for the service. The copy may be made normally non-permanent by streaming it to the intended recipient, by appending in the same or providing in a separate message a first instruction to delete the copy of the media file that may be stored at the intended recipient, and encrypting the copy of the media file and providing only a limited-use decryption key.

The present invention is, in another embodiment, a method of doing business over a network such as the internet. The method includes receiving a request over a network from a first party to send a media file to a third party. The request specifically identifies the media file and the third party. The method further includes collecting a payment from the first party, which is satisfied upon receiving an authorization from the first party to charge or debit a financial account. The method further includes sending the requested media file to the third party using the internet and a wireless link, wherein the sent media file includes provisions to prevent that copy of the media file from normally being permanently stored on a storage media of the third party. The provisions may include streaming the media file to the third party, encrypting the media file, and sending a first instruction to the third party that automatically deletes the sent media file after it is played or opened. The method may further include offering to the first party an option to send the media file, which may not be identified at the time of this offer, via a first communication pathway for a first price and via a second communication pathway for a second price. The method may also include sending an offer message to the third party offering to provide a permanent copy of the media file in return for a payment or a payment authorization from the third party.

In yet another aspect, the present invention is a computer that includes a computer program embodied on a tangible storage medium. The computer program includes instructions that cause the computer to receive over a network a request and payment authorization from a first party, to determine a particular media file and an intended recipient from the request; and to send to the intended recipient a non-permanent copy of a particular media file. In this embodiment, it is the computer program that imposes automatically executing conditions on the copy of the media file that prevent it from normally becoming permanently stored at the intended recipient. As above, those conditions may include streaming the copy of the media file to the intended recipient, providing a first instruction to the intended recipient that automatically deletes the copy of the media file, and encrypting the copy of the media file.

Certain embodiments of the invention may entail downloading or uploading software to a mobile terminal, such as to increase functionality with the content provider or to allow the particular media file downloaded as a greeting message to be played. A mobile station is yet another embodiment of the present invention, wherein the mobile station has, embodied on a tangible storage medium, a program of computer instructions that cause the mobile station to send a request to a content provider. The request includes identifiers of a specific third party mobile station and of a particular media file to be sent by the content provider to the third party mobile station. The instructions may also cause the mobile station to display a selectable choice between proposed delivery pathways by which the particular media file is to be sent. Proposed pathways is not to imply that each is available and valid for the particular identified third party; preferably each pathway choice represents some tradeoff between speed and reliability of media file delivery to the third party mobile station, as speedier pathways may not be as ubiquitous as slower pathways.

In another embodiment of the mobile station, the instructions may further cause the mobile station to receive a message that includes a media file and a first instruction to delete the media file, to open the received media file, and, subsequent to opening the received media file, to delete the media file in accordance with the first instructions.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

FIG. 6 is a block diagram of a mobile station appropriate for implementing the present invention.

DETAILED DESCRIPTION

Figure 1:
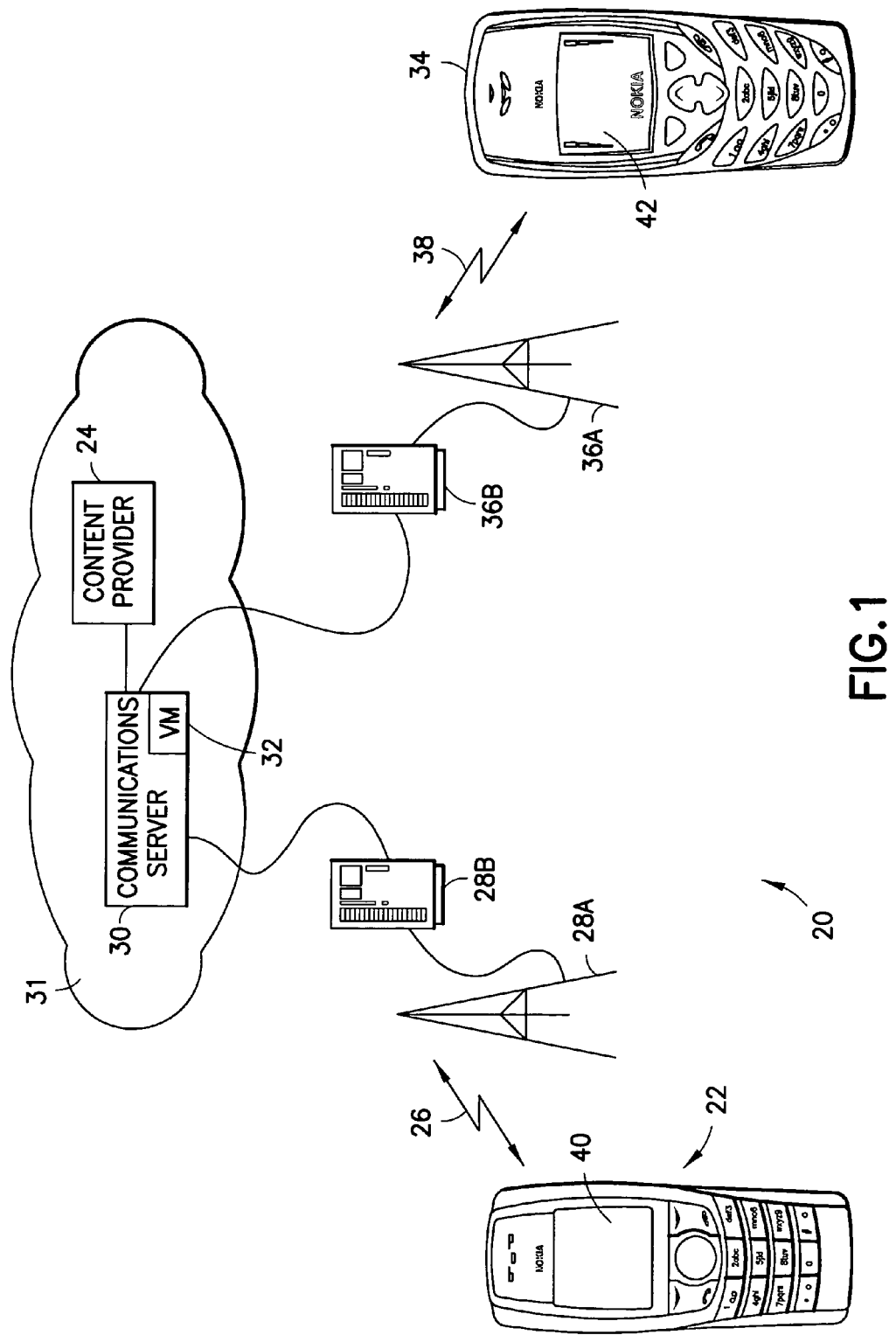
FIG. 1 is schematic diagram of a communication system having two mobile stations, and represents an environment in which the present invention may be deployed.

The present invention is preferably employed in the environment of a multi-networked communication system 20 of FIG. 1, though both of the depicted mobile stations may be in communication with the same base station where their geographic proximity allows. It is a multi-network system because communications pass through both a mobile telephony communications network and a broad based network such as the internet. The broad based network may alternatively be a circuit switched phone network, or a combination of networks. In accordance with the preferred embodiment, a first mobile station 22 sends a request to a content provider 24. The request is communicated through a first mobile telephony link 26 in the uplink direction to a first base station 28 (depicted as first tower 28A and first processor 28B) that serves a geographic cell in which the first mobile station 22 operates. The first base station 28 is in contact with a communications server 30 that may have voicemail storage 32 for storing messages to the first or other mobile stations that cannot be immediately delivered to the intended recipient. The communications server 30 is in communications with the content provider 24 over a broad-based network 31 such as the internet, though the communications server 30 may in fact be co-owned and/or co-located with the content provider 24.

In general, the content provider 24 is a retailer of digital electronic entertainment media files, such as music, video, audio-video and image files. These files are generally copyright protected, in which case the content provider licenses copies of the media files with use restrictions, such as restrictions against further copying and commercial distribution, restrictions against subverting anti-piracy protections, reserving rights in derivative works, etc. It is a common business practice that broader license rights engender a higher retail price, so that a licensor will charge more for a permanent media file that may be played multiple times as compared to that same media file that is licensed only for a more limited time or a lesser number of playbacks.

These media files may be compressed according to any of various current and developing standards, such as MP-3, MP-4, and AAC for music files, JPEG and Bitmap for image files, MPEG-4 and H.263 for video files and the like. For the purposes used herein, a change in the compression format of an underlying media file is not a change to the substantive media file unless otherwise stipulated, despite differences in playback quality that may be inherent in the changed compression format. Opening or playing a media file is converting the file to a humanly perceptible format, such as converting a music media file to the audible song from which the original file was created, converting an image file to a displayed or printed picture, and converting a video clip to a sequenced stream of displayed visual images.

The requesting party need not be a mobile station, but may communicate directly with the content provider via a personal computer using the internet 31. The content provider 24 receives the request from the first mobile station 22 or other requesting party, which includes an identifier of a particular media file and an identifier of a third party to which a copy of that media file is to be sent. For example, a husband on a business trip using the first mobile station 22 may request that the song entitled "Unchained Melody" be sent to his wife using a second mobile station 34. The request may then include the song title and the phone number of the second mobile station 34. The content provider 24 may have several versions of that song title in a database it uses for downloading media files to customers, and one or a series of exchanges may take place between the content provider 24 and the first mobile station 22 to uniquely identify to the content provider 24 the particular song to be sent. For example, the first mobile station 22 may identify the version by the artist "The Righteous Brothers" over other artists performing the same song. Alternatively, the first mobile station may provide a sample of the particular media file to be sent, or an electronic identifier of it, from which the content provider 24 uniquely identifies the particular media file. The content provider 24 may access the particular media file itself from a database (not shown) that may or may not be co-located with the content provider server 24, or the database may be maintained by another entity apart from the content provider 24 that grants access to the content provider via a business arrangement.

Consistent with the request, the content provider 24 provides a copy of the particular media file to the second mobile station 34. This copy is communicated to the communication server 30 over the internet or other broad-based network 31, which sends it through a second base station 36 (second processor 36B, second tower 36A) over a second mobile telephony link 38 in the downlink direction to the second mobile station 34. Where the second mobile station 34 is not currently available (e.g., turned off, busy, beyond reach of a mobile telephony network), a message from the content provider may be stored in the voicemail storage 32 as is known in the art. However, in this instance, the message stored in VM storage 32 may be the copy of the media file itself as is normal practice with voice messages, or instead may be merely a message with a link to access the content provider 24 to receive a copy of that particular media file. The first and second mobile stations 22, 34 have respective first and second displays 40, 42.

An important aspect of the present invention is that the copy of the particular media file provided to the second mobile station 34 comes with a very restrictive license that normally is automatically self-executing. Specifically, the copy that is downloaded is non-permanent, and will normally and automatically be deleted after a certain proscribed time period, after a certain proscribed number of plays (number of times the media file is opened), and the like. Preferably, the downloaded non-permanent copy of the media file of the present invention is used as a greeting, and is therefore normally and automatically deleted following one playback. A signal to cause the non-permanent copy of the media file to delete may be within a first computer instruction that accompanies the copy of the media file, which in this instance need not be otherwise electronically restricted. This first instruction may execute automatically upon the last note of the accompanying song media file being played, or after an elapsed time following the initial opening (whether or not the music, for example, 'plays') of the downloaded media file, an elapsed time after playing a halfway point of the media file, or some other combination of elapsed time and playback point in a file playback sequence. In certain instances where a receiving unit or mobile station does not have an application software to execute or open the received media file(s), the content provider may provide a hyper link or other direction to the second mobile station as to where such an application file may be obtained.

The above examples presume that the second mobile station 34 receives the call when sent by the communication server 30/second base station 36. If that is the case, the content provider 24 may provide the non-permanent copy of the particular media file as a streaming audio (or video or image, as the case may be), downloaded to the second mobile station 34 as a series of packets or frames just as a common voice communication form the first mobile station 22. In that instance, the second mobile station 34 stores the non-permanent copy of the particular media file in a temporary storage (e.g., buffer) and no separate deletion instructions or other automatic deletion feature need be appended to or made inherent with the streamed copy of the media file; it's streaming method of delivery automatically executes a one-playback limit. Where the second mobile station 34 is not available when initial contact via the second link 38 is attempted, any of the non-streamed embodiments noted above may merely be stored in a voicemail storage 32 for later access by the second mobile station 34.

However, for the embodiment wherein the content provider 24 streams the particular media file, it is desirable to provide affirmative deletion of a streamed copy that would otherwise be stored in the voicemail storage 32. Options for such positive deletion include exchanging messages between the communication server 30 and the content provider 24 as to whether the second mobile telephony link 38 has been established (specifically, that the second mobile station 34 has answered a page from the second base station 36 that is generated in response to the content provider's 24 attempt to contact it). The content provider 24 may adaptively provide one or another type of non-permanent copy of the particular media file to the second mobile station; streaming if presently in communication, and downloaded with automatic delete instructions if not. Alternatively, the content provider 24 may provide the streamed copy with an appended instruction that normally causes automatic deletion of the copy after a very restricted time period (for example, one day), thereby overriding any normal storage protocol for voicemail messages (which typically automatically retain a copy of voicemails for a period of weeks).

Figure 2A:
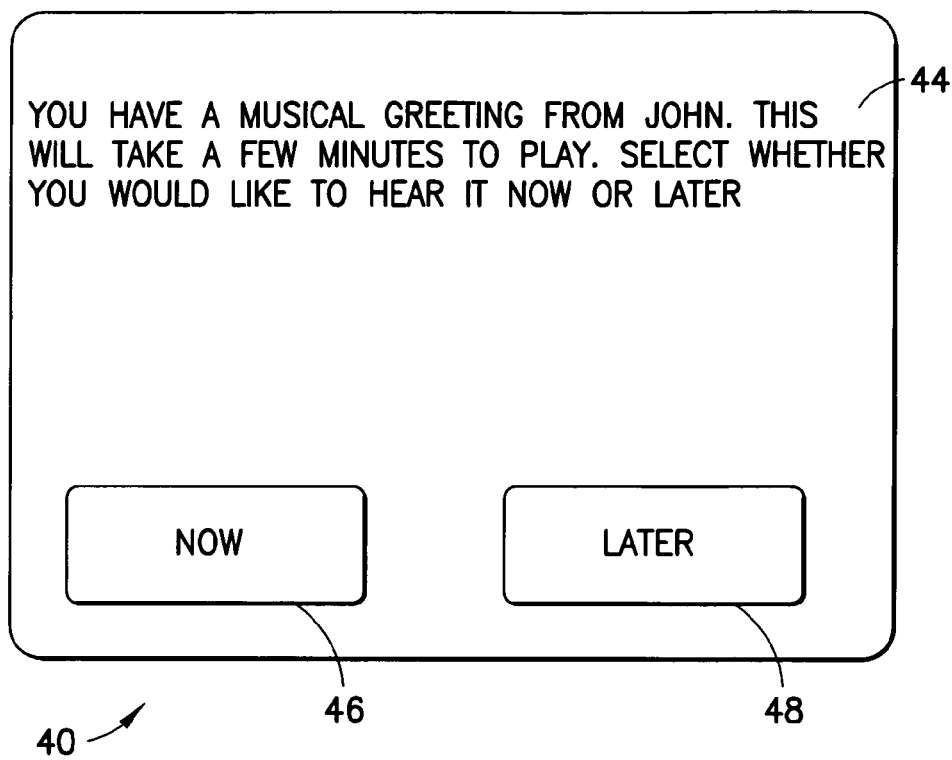
FIG. 2A is a plan view of a display of a receiving mobile station prior to the user playing a media file greeting in accordance with the present invention.

A valuable aspect of the present invention is the opportunity for the user of the second mobile station 34 to open the non-permanent copy of the particular media file either immediately or at a later time. This aspect may be embodied as shown in FIG. 2A, which is the display 42 of the receiving or second mobile station 34 prior to playing the media file greeting. Consider that the user of the first mobile station 22 is typically unaware of the exact location of the second mobile station 34. Were the user of the second mobile station 34 on a crowded subway, for example, any sentiment intended to be reflected in the media file greeting may be frustrated by the user's environment. To address this concern, FIG. 2A illustrates on the second display 2A an option 46, 48 to play the media file now or later. Preferably the content provider 30 first provides an alert message such as that in FIG. 2A that displays on the second mobile station 34 a greeting alert 44 that a greeting is waiting and two options that allow the user to 'play' the media file greeting now or at a later time. To enable this aspect of the invention, preferably this alert message is also appended to a non-permanent copy of the media file that is stored at the second mobile station 34 regardless of the user's now-or-later selection. The first user 22 can define the text or image that is displayed during the song playback time in the display of the second user 40. This actual greeting text or image can be defined or delivered for example during the first communication 56 to the content provider. The content provider may also offer to the user a selection of pre-made greeting texts or images to be attached to the music song greeting.

In one embodiment, the 'now' selection 46 causes the non-permanent copy to play and the 'later' selection 48 causes the non-permanent copy to be stored as an encrypted copy. When the user attempts to open the encrypted copy, a message herein termed a key request message is automatically sent from the second mobile station 34 to the content provider 30. The content provider 30 responds with a key message, which includes a decryption key that allows the second mobile station to open the stored and encrypted non-permanent copy of the media file. In another embodiment, the content provider initially sends only the alert message depicted in FIG. 2A, with no accompanying copy of the media file. When the user selects the 'now' button 46, the second mobile station 34 automatically sends a greeting request message to the content provider 30, who responds with a streamed or automatically deleting copy of the particular media file. When the user selects the 'later' button 48, the same result occurs but only after the user later re-opens the alert message or selects an icon or link that is generated in response to the first selection of the 'later' button 48.

Figure 2B:
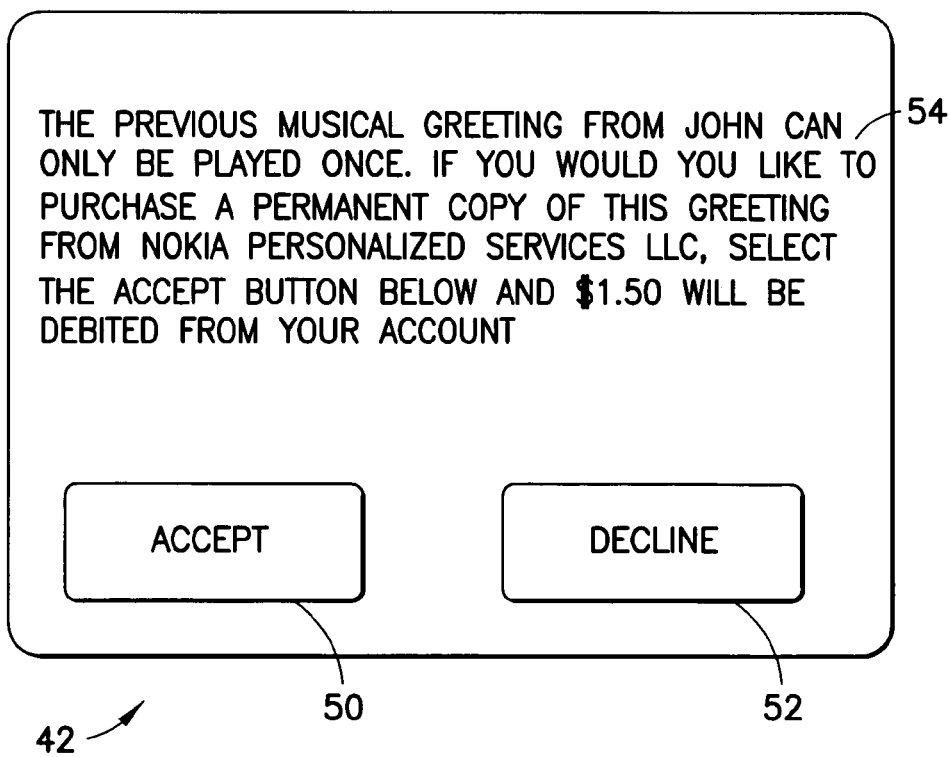
FIG. 2B is a plan view of a display of a receiving mobile station following the user playing a media file greeting in accordance with the present invention.

An additional valuable aspect of the present invention is a provision whereby the user of the second mobile station 34 is given an opportunity to purchase a permanent copy of the particular media file. As used in the context of the use of the second mobile station 34 purchasing a copy of the particular media file, a permanent copy merely means one that is not normally automatically deleted after only one or a few playings. A non-permanent copy is one which is accessible for an extremely limited number of times, such as one or a few playings, or an extremely limited period of time. Where the instruction to delete the non-permanent copy is a first instruction, this aspect can be facilitated by the content provider 24 appending a second instruction to the non-permanent copy of the media file for the second mobile station 34 to display a purchase option 50, 52 as shown in FIG. 2B. It may also come in a separate message not appended to the media file copy. Providing the purchase option 50, 52 is technically an offer for sale by the content provider 30 of a copy of the media file, so that message from the content provider is herein termed an offer message. FIG. 2B is the display 42 of the receiving or second mobile station 34 showing the offer message that is preferably displayed following the playing of the media file at the second mobile station 34. The offer message preferably includes a text offer 54, a purchase option 50 ('accept' button), and a decline option 52 ('decline' button). The 'accept' button 50 may include a link to the content provider 30 whereby the user of the second mobile station 34 may purchase a permanent copy of the particular media file.

When the 'accept' button is selected, the second mobile station 34 sends a message to the content provider 30 that accepts its offer to sell a permanent copy of the particular media file. This message will be termed an offer acceptance message to avoid confusion with other messages. When the 'decline' button is selected, the first instruction to delete the non-permanent copy of the particular media file is executed. As an additional protection, the second instruction may automatically enter the 'decline' button 52 if the display is changed by a means other than selecting the 'accept' button 50 (as where the user of the second mobile station 34 turns it off or changes the display view without selecting an option).

Where the user of the second mobile station 34 selects the purchase option 50, certain embodiments may avoid the need to download an additional copy of the particular media file by converting the non-permanent copy to a permanent copy. This conserves bandwidth in the mobile telephony system. One approach to do so is for the content provider 30 to provide an electronic key that defeats or otherwise disables the automatic delete features built into the non-permanent copy that is already downloaded to and stored in the second mobile station 34.

Figure 3A:
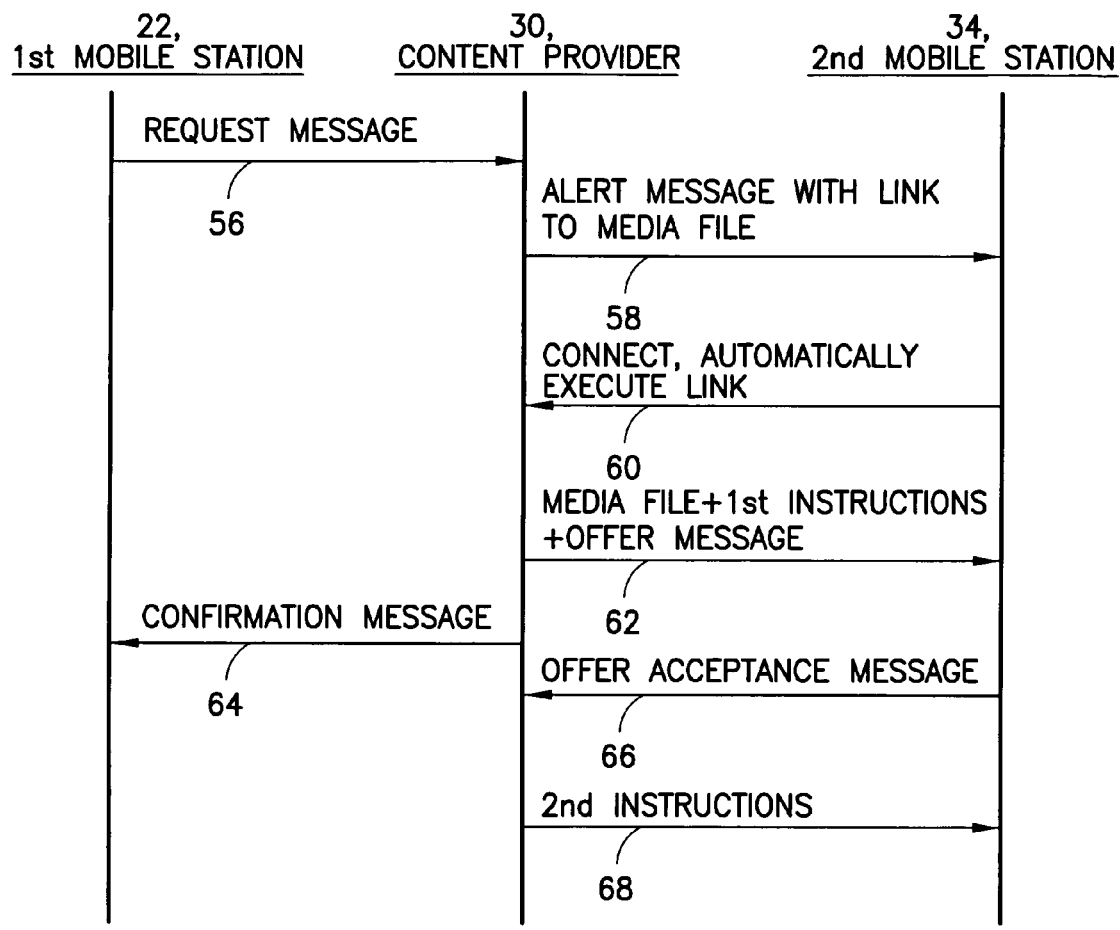
FIG. 3A is a communication diagram showing messages exchanged between mobile stations and a content provider, according to the preferred embodiment of the present invention.
Figure 3B:
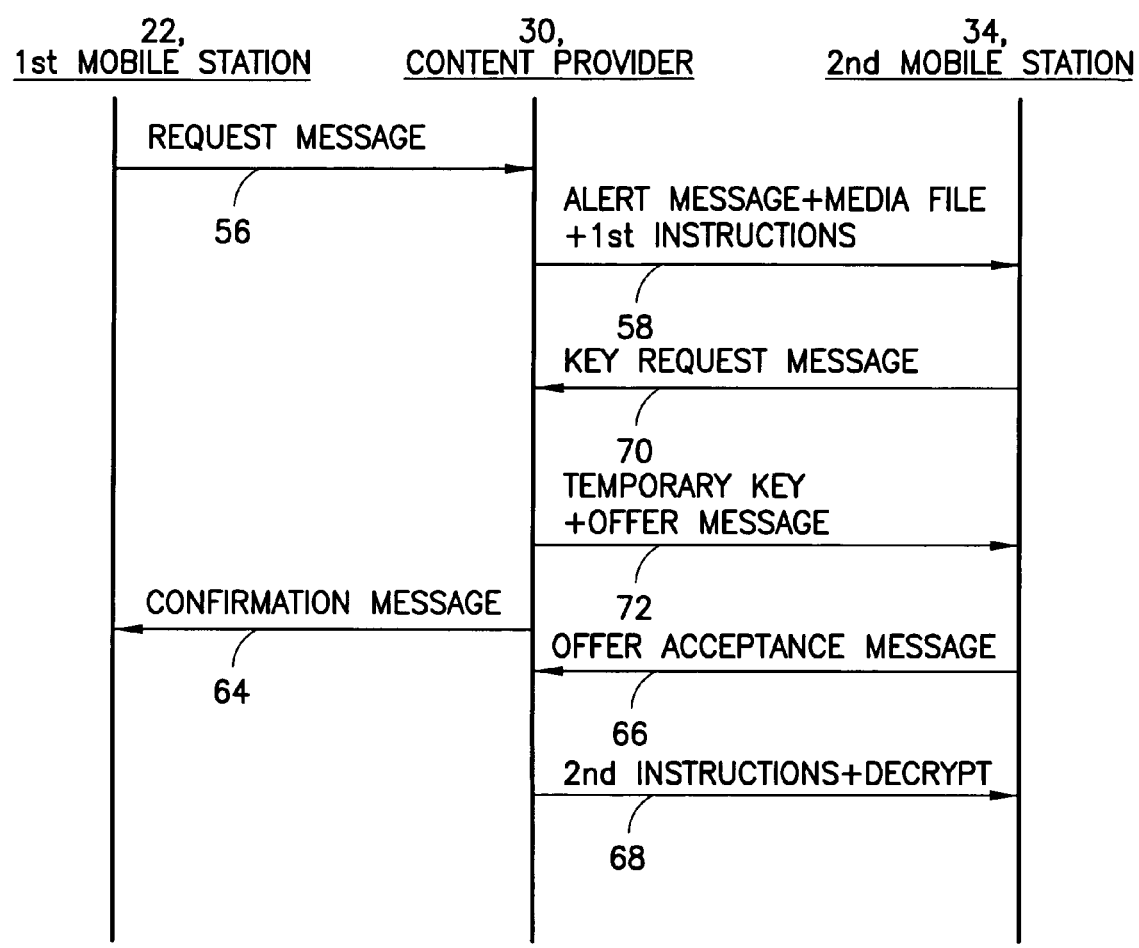
FIG. 3B is similar to FIG. 3A, but according to an alternative embodiment of the present invention.

FIGS. 3A-B are communication diagrams that shows messages exchanged between the first mobile station 22, the content provider 30, and the second mobile station 34, according to the preferred embodiment (FIG. 3A) and an alternative embodiment (FIG. 3B). The exchange is chronological from the top of each drawing to the bottom.

In FIG. 3A, the exchange begins with the first mobile station 22 sending a request message 56 to the content provider 30, identifying the media file. The first mobile station 22 preferably pays for this service via credit or debit card authorization in the request message. The content provider 30 sends an alert message 58 to the second mobile station 34 that includes a link to the media file, giving its user the option of hearing the (musical) greeting now or later as in FIG. 2A. Regardless of the selection, at some time following the greeting alert message 58, the user of the second mobile station 34 elects to hear the greeting, and the second mobile station 34 connects to the content provider 34 by automatically executing the link 60 that was provided in the alert message 56. It is automatic because it occurs upon the user of the second mobile station 34 selecting the 'now' option 46, or upon the user later selecting the icon or link generated by an initial selection of the 'later' option 48.

In response, the content provider 30 then downloads 62 a copy of the media file identified in the request message 56 (which may be encrypted), appended with the first and second instructions and the offer message. As above, the first instructions cause the media file to be normally deleted after one playing, and the second instructions defeat that deleting of the first instructions. A decryption key may be included in the download 62. The content provider 30 may also send a confirmation message 64 to the first mobile station 22 informing that user that the message request 56 has been completed. Where the user of the second mobile station elects the purchase option in response to the offer message, the second mobile station 34 then sends an offer acceptance message 66 to the content provider 30. Where this is a subsequent transaction between the content provider 30 and the second mobile station 34, an authorization to charge a credit or debit account already on file with the content provider 30 need not include the underlying account information in the message 66. The content provider 30 then sends the second instructions 68, which delete or otherwise defeat the first instructions prior to their deletion of the media file.

An alternative embodiment is depicted in FIG. 3B. Following a similar request message 56, the content provider 30 sends an alert message 58, which in this instance includes an encrypted copy of the media file and the first instructions. The second mobile station 34 elects to open the encrypted media file, which automatically sends to the content provider a key request message 70. A delay may occur at this juncture for call setup and routing between the content provider 30 and second mobile station 34. The content provider 30 in reply sends a temporary key 72 and the offer message. The second mobile station 34 uses the temporary key to play the media file greeting, and the offer message is displayed. The temporary key may be self-deleting, or may be operable to decrypt the encrypted media file only one time or a limited number of times, or may remain valid only for a period of time following its download to the second mobile station 34. A confirmation message 64 may also be sent to the first mobile station 22. If the second mobile station 34 elects to purchase a more permanent copy of the media file, an offer acceptance message 66 is sent on selecting the 'accept' option 50 from the offer message. The content provider 30 in response sends the second instructions 68, and either a permanent decryption key or a code to decrypt the encrypted media file so that a decrypt key is no longer necessary to play it.

In any embodiment in which the user is given the opportunity to purchase the song, suspending or delaying execution of the first instructions for a time enables a solution where multiple copies of the media file need not be downloaded to the same second mobile station 34. For example, the first instructions may be executed only upon the user selecting other than the 'accept' button 50, or may execute automatically after an elapsed period of time following the opening or end of a media file. Other options are possible.

While the present invention may be put to immediate use in the context of music files as personalized greetings, modifications described hereafter better adapt the invention to use with multi-media files such as audio/video clips. While improvements in data throughput for a traditional mobile telephony network have been made and may soon rival hardwired connections, it will be some years before the majority of mobile equipment carries the multiple antenna hardware and associated software for high throughput MIMO communications. A consortium of companies has developed a digital video broadcast standard (DVB-H, derived from DVB-X) particularly adapted for the power consumption concerns of handheld devices and data throughput limits of cellular networks. Specifics may be found at www.dvb.org. As related to the present invention, a first mobile station 22 may send a media file greeting to the second mobile station 34 via one of several data pathways, depending upon the sender's personal considerations as to speed and reliability of the pathway.

Figure 4:
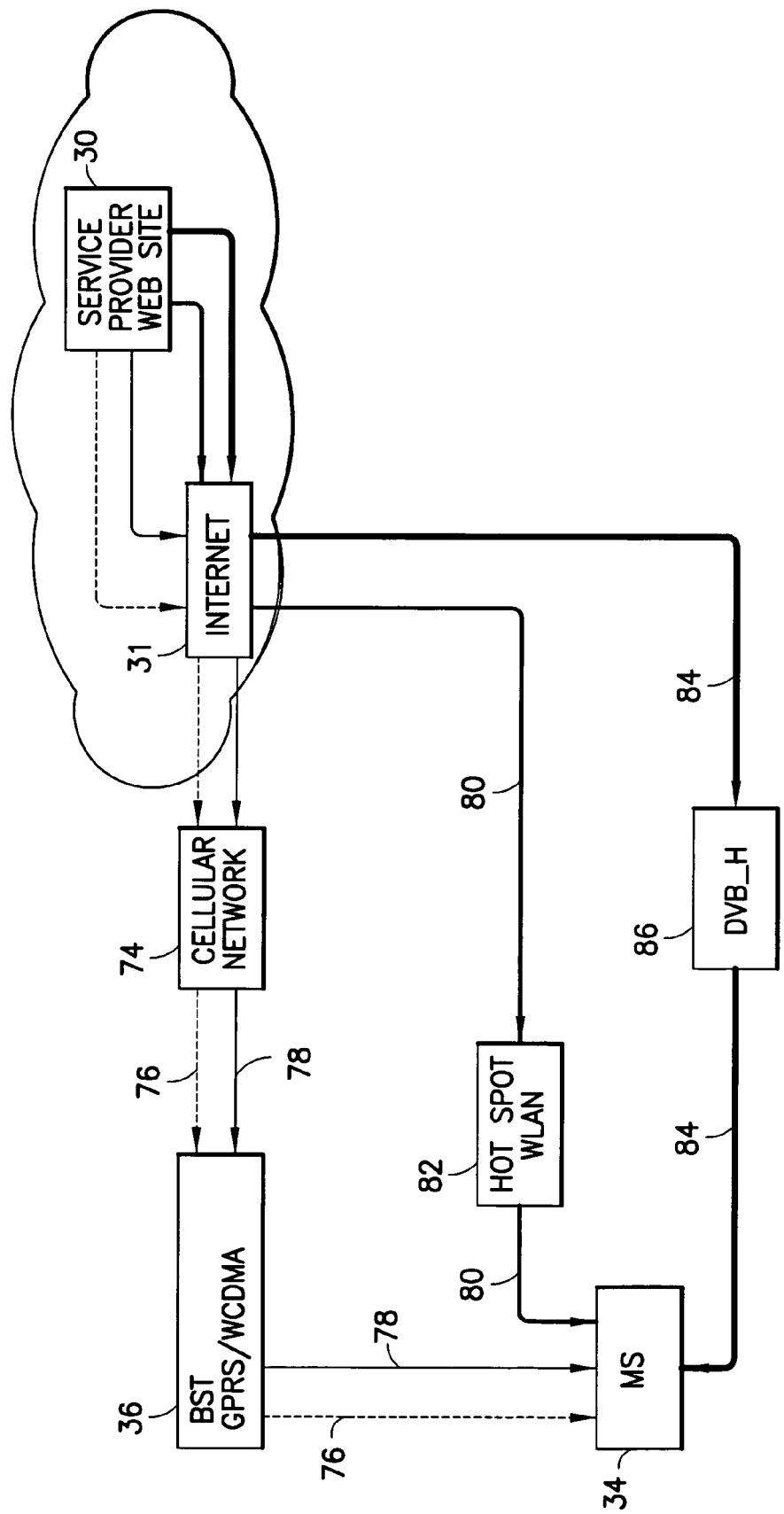
FIG. 4 is a schematic diagram showing several data pathways from which the sending mobile station may choose by which the media file may be communicated to the receiving mobile station.

A schematic diagram of such various pathways is shown in FIG. 4. The content provider 30 communicates messages to the receiving or second mobile station 34 via the internet 31 and a cellular network 74 as previously described with reference to FIG. 1, wherein the second mobile station 34 is in direct contact with base station(s) 36. Two data pathways are possible through the cellular network 74, a slow speed pathway 76 and a medium speed pathway 78. The slow speed pathway 76 may be defined by, for example, a general packet radio service (GPRS) communication protocol, whereas the medium speed pathway 78 may be defined by, for example, a wideband CDMA communication protocol. A fast speed pathway 80 preferably utilizes a wireless local area network (WLAN). In this case, the fast pathway 80 passes through a wireless local area network (WLAN) hotspot 82, which is a node (e.g., personal computer, server, another mobile station) of a WLAN that couples the WLAN to the broader internet 31. A very fast pathway 84 utilizes a DVB standard, preferably DVB-H that is optimized for handheld devices such as mobile stations. The pathway speeds as used herein are relative to one another and not predicated on an absolute data rate value.

Because an air interface for each of the four communication pathways 76, 78, 80, 84 are not universally available, lesser availability translates into less reliability that the media file will be communicated to the second mobile station. While a user of the sending or first mobile station 22 might wish that the very fast pathway 84 be employed in delivering the chosen media file, the second mobile station 34 may not be in a geographic location that is reachable via a DVB-H transmitter 86. In a preferred embodiment, the first mobile station 22 selects which communication pathway the media file is communicated to the second mobile station 34 by selecting from among comparative speed options, comparative reachability (or reliability) options, or a combination of both, wherein each pathway is identified by its relative speed and/or reachability. When the first mobile station 22 first contacts the content provider 30, the content provider 30 sends a pathway option message back to the first mobile station 22 with preferably three delivery options: slow with high reliability (pathways 76 and 78), fast speed with medium reliability (pathway 80), and very fast speed with low reliability (pathway 84). Alternatively, the content provider 30 may provide four options for the four pathways.

Regardless, the separate communication pathways are priced differently, so that, for example, delivering the media file to the second mobile station 34 via the very fast pathway 84 is priced higher than via the slow pathway 76. Use of the alternate (non-cellular) pathways 80, 84 will alleviate further demands on scarce cellular network resources, especially high demands inherent in downloads of media files having a video component. The customer, who is the user of the first mobile station 22 since he/she is the one paying for the media file greeting service, is given more options and price points from which to choose. The content provider 30 may send the pathway option message in response to the first mobile station's request message 56, or may send it prior to that message 56 so that the request message 56 includes the selected delivery pathway. Obtaining authorization from the first or second mobile station to charge a credit card or debit account constitutes collecting payment.

The audio or video clip quality may vary dependent on the selection of the delivery path. Since the better quality pictures and video/audio files demand more data than lower quality ones, the content delivery speed is related to the size of the selected file. If the first user 22 wants to have constant delivery time to second user 34, then the selected content may be scaled to the selected delivery route data speed. This can be done by offering multiple choices of the same song, which have been done by using different coding bit rates.

Figure 5:
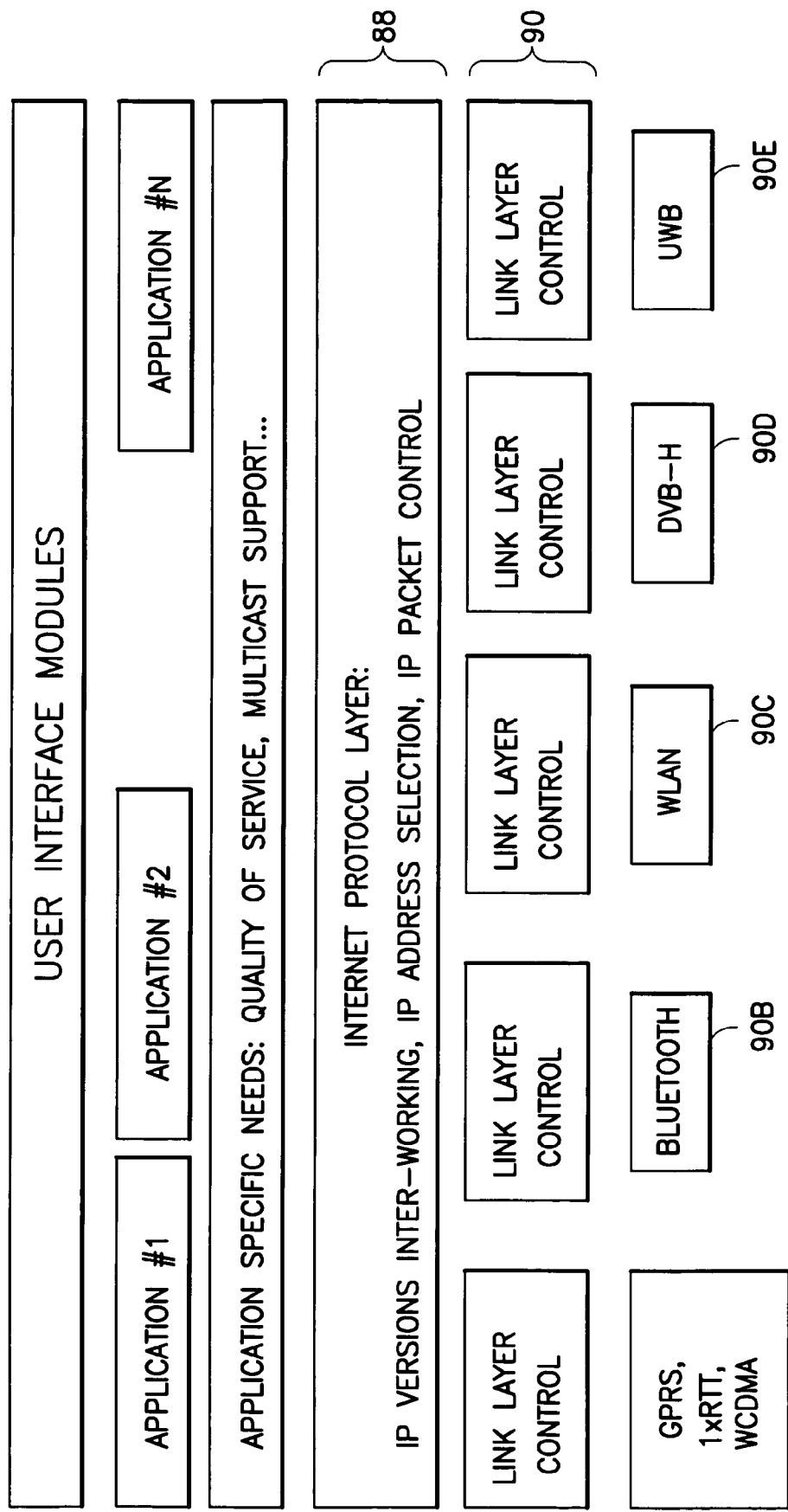
FIG. 5 is a block diagram showing a communication architecture for a mobile station capable of communicating over the disparate communication pathways of FIG. 4.

Proposed communication architecture for a mobile station capable of communicating over disparate communication pathways 76, 78, 80, 84 is shown in FIG. 5. Important differences from more traditional terminal architecture lay in the IP layer 88 and the link layer 90. In the IP layer 88, the mobile station determines which address to use; the recipient mobile station phone number where the communication pathway 76, 78 is via a cellular network 74, and a terminal internet address when the communication pathway 80, 84 is via an alternative, non-cellular delivery mechanism. In the link layer 90, each separate column 90A-E represents a different type of communication pathway, though not each is necessarily implicated in the present invention. For example, the GPRS/WCDMA link column 90A creates the link to the base station 36 and cellular network 74, the WLAN link column 90C creates the link to the WLAN hotspot 82, and the DVB-H link column 90D creates the link to the DVB-H transmitter 86. The Bluetooth link column 90B may create a link to a personal computer to which the media file is delivered, in which any wireless link need be limited to only the range of a personal area network, but that option is anticipated to be commercially less viable than those discussed in detail above.

FIG. 6 depicts a block diagram of a mobile station 34 on which the inventive computer program may be stored that may operate in accordance with the invention. The same mobile station 34 may send or receive a greeting message. The mobile station 34 has a display 101 for displaying a text message or icon that is associated with the copy of the media file, a keypad 102 (or a touch sensitive display) for entering such a text message, and a microphone 104 for recording a personalized message or for normal radiotelephone communications. Voice communications from the microphone 104 are processed in an encoding block 106 where the speech is coded 108, spread (if a spread spectrum communication protocol such as CDMA) and modulated 110 onto a carrier wave, and amplified 112. The resulting signal is fed into a T/R block 114 where a switch 116 selectively couples one or more antennas 118 with either the encoding block 106 or a decoding block 120. Voice communications received at the antenna 118 are routed to the decoding block 120 where they are amplified 122, demodulated and despread (if appropriate) 124, decoded 126, and converted to an audible signal at a speaker 128 or other transducer. When a media file is received, the decoding block 120 amplifies and demodulates/despreads the signal, and a logical assembly 130 such as an integrated circuit chip 131 determines the file type and an appropriate application to open the media file. That application, the (non-permanent) copy of the media file, and the computer instructions of the present invention may be stored at any of a RAM memory 132, ROM memory 134, or flash memory 136. Typically, the flash memory 136 includes a stored codebook 138 for coding 108 and decoding 108 speech and other electronic signals. A controller 140 is coupled to the logical assembly 130 and controls flow to and from the keypad 102, display 101, and logical assembly 130.

The present invention may be embodied on a computer storage medium such as a hard drive or optical disk as a program of machine-readable instructions that are executable by a digital processor, preferably accessible to and executed by a content provider's server. While there has been illustrated and described what is at present considered to be a preferred embodiment of the claimed invention, it will be appreciated that numerous changes and modifications are likely to occur to those skilled in the art beyond those alternative presented explicitly herein. It is intended in the appended claims to cover all those changes and modifications that fall within the spirit and scope of the claimed invention.

What is claimed is:

1. A program of machine-readable instructions, tangibly embodied on an information bearing medium and executable by a digital data processor, to perform actions directed toward providing a media file to a third party mobile station, the actions comprising:
   providing a first party with a choice between a first wireless pathway and a different second wireless pathway for media file delivery;
   receiving a request over a network from the first party to deliver a particular media file to a third party mobile station that is identified in the request and a selection from among the first and second wireless pathways; and
   providing a non-permanent copy of the particular media file to the third party mobile station via a first wireless network that comprises the first wireless pathway or via a second wireless network that comprises the second wireless pathway according to the selection.

2. The program of claim 1 wherein providing a non-permanent copy comprises streaming the particular media file over the first or second wireless network.

3. The program of claim 1 wherein providing a non-permanent copy comprises providing instructions to automatically delete the non-permanent copy of the particular media file from a storage media of the third party mobile station.

4. The program of claim 3 wherein providing a non-permanent copy of the particular media file further comprises providing an offer message that causes the third party mobile station to display, subsequent to a first playing of the non-permanent copy of the particular media file, an accept option that, when selected, causes the third party mobile station to send an offer acceptance message, wherein the offer message comprises an offer to sell a permanent copy of the particular media file.

5. The program of claim 4 wherein the offer message further causes the third party mobile station to display a decline option that, when selected, causes the instructions to execute and delete the non-permanent copy of the particular media file.

6. The program of claim 4 wherein the instructions to automatically delete comprise a first instruction, the actions further comprising sending a second instruction to the third party mobile station that operates to defeat the instructions to automatically delete the non-permanent copy.

7. The program of claim 3 wherein the instructions to automatically delete the non-permanent copy execute upon at least one of an elapsed time following the non-permanent copy being opened and reaching a playback point of the non-permanent copy once opened.

8. The program of claim 1 wherein the actions further comprise providing a greeting alert message that causes the third party mobile station to display an option to play the non-permanent copy of the particular media file at a later time.

9. The program of claim 8 wherein providing a non-permanent copy of the particular media file comprises providing an encrypted copy of the media file, and wherein the greeting alert message further causes, upon selecting at least the option to play the non-permanent copy of the particular media file at a later time, a key request message to be sent to the network that requests a key to decrypt the encrypted media file.

10. The program of claim 8 wherein the greeting alert message and the non-permanent copy of the media file are provided to the third party mobile station in separate messages.

11. The program of claim 1 wherein receiving a request over a network from a first party further comprises receiving a greeting message for display from the first party, and wherein providing a non-permanent copy of the particular media file to the third party mobile station further comprises providing the greeting message to the third party mobile station in a displayable format.

12. The program of claim 1 wherein providing a non-permanent copy of the particular media file comprises providing an encrypted copy of the media file.

13. The program of claim 1 wherein providing the first party with a choice between the first and the second wireless pathways comprises offering to provide the non-permanent copy via the first wireless pathway for a first price and offering to provide the non-permanent copy via the second wireless pathway for a different second price.

14. The program of claim 13 wherein the actions further comprise charging the first party for providing the non-permanent copy at the first price if the first wireless pathway is selected, and at the second price if the second wireless pathway is selected.

15. The program of claim 1, wherein the first wireless network comprises a cellular network and the second wireless network comprises one of a wireless local access network and a digital video broadcast network.

16. A method comprising:
   providing a first party with a choice between a first wireless pathway and a different second wireless pathway for media file delivery;
   receiving a request over a network from the first party to deliver a particular media file to a third party mobile station that is identified in the request and a selection from among the first and second wireless pathways;
   sending a non-permanent copy of the particular media file to the third party mobile station via a first wireless network that comprises the first wireless pathway or via a second wireless network that comprises the second wireless pathway according to the selection.

17. The method of claim 16, wherein sending a non-permanent copy comprises sending instructions to automatically delete the non-permanent copy of the particular media file from a storage media of the third party mobile station.

18. The method of claim 17, wherein sending a non-permanent copy of the particular media file further comprises sending an offer message that causes the third party mobile station to display, subsequent to a first playing of the non-permanent copy of the particular media file, an accept option that when selected, causes the third party mobile station to send an offer acceptance message, wherein the offer message comprises an offer to sell a permanent copy of the particular media file.

19. The method of claim 18, wherein the offer message further causes the third party mobile station to display a decline option that when selected, causes the instructions to execute and delete the non-permanent copy of the particular media file.

20. The method of claim 17, wherein the instructions to automatically delete the non-permanent copy execute upon at least one of an elapsed time following the non-permanent copy being opened and reaching a playback point of the non-permanent copy once opened.

21. The method of claim 16, further comprising providing a greeting alert message that causes the third party mobile station to display an option to play the non-permanent copy of the particular media file at a later time.

22. The method of claim 21, wherein sending a non-permanent copy of the particular media file comprises sending an encrypted copy of the media file, and wherein the greeting alert message further causes, upon selecting at least the option to play the non-permanent copy of the particular media file at a later time, a key request message to be sent that requests a key to decrypt the encrypted media file.

23. The method of claim 16, wherein receiving the request over the network from the first party further comprises receiving a greeting message for display from the first party, and wherein sending the non-permanent copy of the particular media file to the third party mobile station further comprises sending the greeting message to the third party mobile station in a displayable format.

24. The method of claim 16, wherein providing the first party with the choice between the first and the second wireless pathways comprises offering to provide the non-permanent copy via the first wireless pathway for a first price and offering to provide the non-permanent copy via the second wireless pathway for a different second price.

25. The method of claim 16, wherein the first wireless network comprises a cellular network and the second wireless network comprises one of a wireless local access network and a digital video broadcast network.

26. A device comprising:
  a computer processor coupled to a memory storing computer readable instructions;
  a modem coupled to a first base station and adapted to provide to a first party a choice between a first wireless pathway and a different second wireless pathway for media file delivery and adapted to receive a request over a network from the first party to deliver a particular media file to a third party mobile station that is identified in the request and a selection from among the first and second wireless pathways;
  a computer processor coupled to a memory and adapted to retrieve the particular media file from the memory in response to the request; and
  a modem coupled to a second base station and adapted to send a non-permanent copy of the particular media file to the third party mobile station via a first wireless network that comprises the first wireless pathway or via a second wireless network that comprises the second wireless pathway according to the selection.

27. The device of claim 26, wherein the modem coupled to the second base station is adapted to send instructions to automatically delete the non-permanent copy of the particular media file from a storage media of the third party mobile station.

28. The device of claim 27, wherein the modem coupled to the second base station is adapted to send an offer message that causes the third party mobile station to display, subsequent to a first playing of the non-permanent copy of the particular media file, an accept option that when selected, causes the third party mobile station to send an offer acceptance message, wherein the offer message comprises an offer to sell a permanent copy of the particular media file.

29. The device of claim 28, wherein the offer message further causes the third party mobile station to display a decline option that when selected, causes the instructions to execute and delete the non-permanent copy of the particular media file.

30. The device of claim 27, wherein the instructions to automatically delete the non-permanent copy execute upon at least one of an elapsed time following the non-permanent copy being opened and reaching a playback point of the non-permanent copy once opened.

31. The device of claim 26, wherein the modem coupled to the second base station is adapted to send a greeting alert message that causes the third party mobile station to display an option to play the non-permanent copy of the particular media file at a later time.

32. The device of claim 31, further comprising encryption circuitry, wherein the modem coupled to the second base station is adapted to send an encrypted copy of the media file, and wherein the greeting alert message further causes, upon selecting at least the option to play the non-permanent copy of the particular media file at a later time, a key request message to be sent that requests a key to decrypt the encrypted media file.

33. The device of claim 26, wherein the modem coupled to the first base station is adapted to receive a greeting message for display from the first party, and wherein the modem coupled to the second base station is adapted to send the greeting message to the third party mobile station in a displayable format.

34. The device of claim 26, wherein the choice between the first and second wireless pathways comprises an offer to provide the non-permanent copy via a first pathway for a first price and an offer to provide the non-permanent copy via a different second pathway for a different second price.

35. The device of claim 26, wherein the first wireless network comprises a cellular network and the second wireless network comprises one of a wireless local access network and a digital video broadcast network.

36. A device comprising:
  communication means for providing to a first party a choice between a first wireless pathway and a different second wireless pathway for media file delivery and for receiving a request over a network from the first party to deliver a particular media file to a third party mobile station that is identified in the request and a selection from among the first and second wireless pathways; and
  processing means for retrieving the particular media file from the memory in response to the request;

wherein the communication means is further for sending a non-permanent copy of the particular media file to the third party mobile station via a first wireless network that comprises the first wireless pathway or via a second wireless network that comprises the second wireless pathway according to the selection.

37. The device of claim 36, wherein the communication means comprises at least one modem and the processing means comprises a processor coupled to a memory.

* * * * *